United States Patent [19]

Ordoñez

[11] 4,046,423
[45] Sept. 6, 1977

[54] LIFTING MEMBERS FOR TRUCK BODIES AND SIMILAR UNITS

[76] Inventor: Marino Pañeda Ordoñez, C<sup>a</sup> de Oviedo, Pumarin, Gijon, Spain

[21] Appl. No.: 667,852

[22] Filed: Mar. 18, 1976

[30] Foreign Application Priority Data

Apr. 3, 1975   Spain ..................... 436287

[51] Int. Cl.² .............................................. B65G 67/30
[52] U.S. Cl. ................................................ 298/22 D
[58] Field of Search ............. 298/22 R, 22 AE, 22 C, 298/22 F, 22 J, 22 P, 22 A, 22 B, 22 D, 1 A, 17 R; 214/314, 501

[56] References Cited

U.S. PATENT DOCUMENTS

| 1,906,302 | 5/1933 | Anthony | 298/22 B |
| 2,593,776 | 4/1952 | Margala | 298/22 B |

FOREIGN PATENT DOCUMENTS

| 31,091 | 12/1960 | Finland | 298/22 B |
| 347,894 | 11/1963 | France | 298/22 R |

*Primary Examiner*—Frank E. Werner
*Attorney, Agent, or Firm*—Brady, O'Boyle & Gates

[57] ABSTRACT

A generally rectangular lifting stabilizer arm is pivotally connected on opposite sides at one end thereof between a pair of stationary truck frame members and is movably connected on the outer free end by a pair of slide track type connections to oppositely disposed longitudinal members of a dump frame that is pivotally connected to the stationary truck frame members, and a hydraulic cylinder-piston assembly is pivotally connected on one end to a central portion of the rectangular lifting stabilizer arm and is pivotally connected on the opposite end to the dump frame, whereby actuation of and minimal travel of the cylinder-piston assembly pivots the lifting stabilizer arm and cylinder-piston assembly, and pivots the dump frame in different arcs from horizontal positions above the truck frame members to a raised dump position.

3 Claims, 7 Drawing Figures

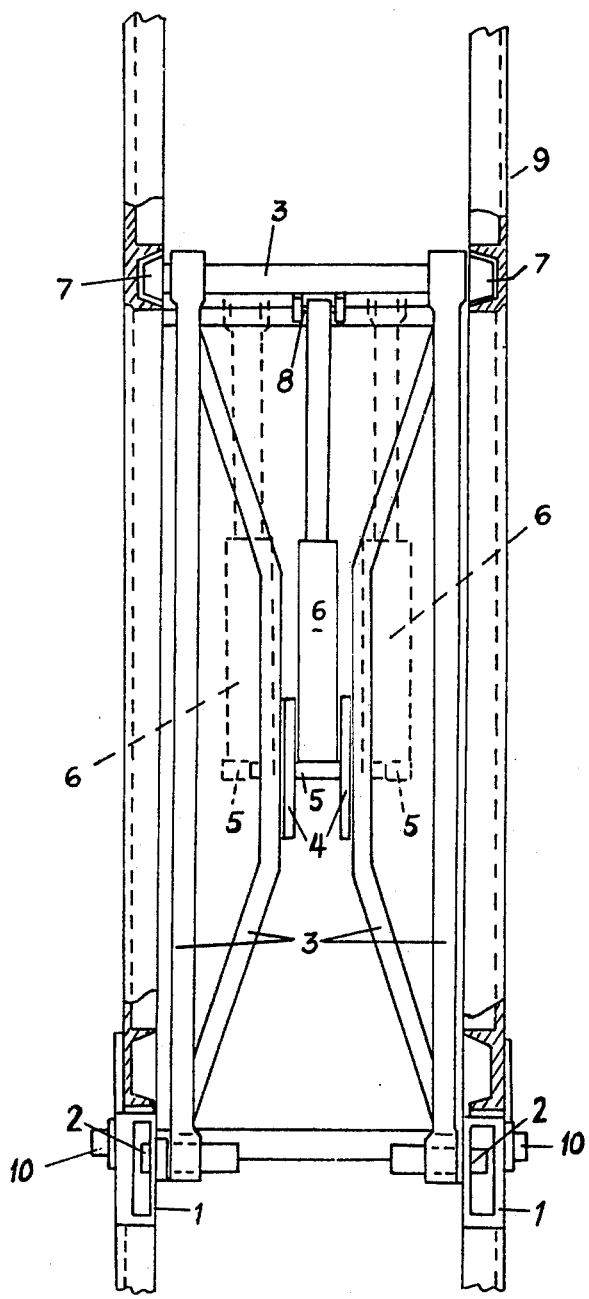
Fig. 3
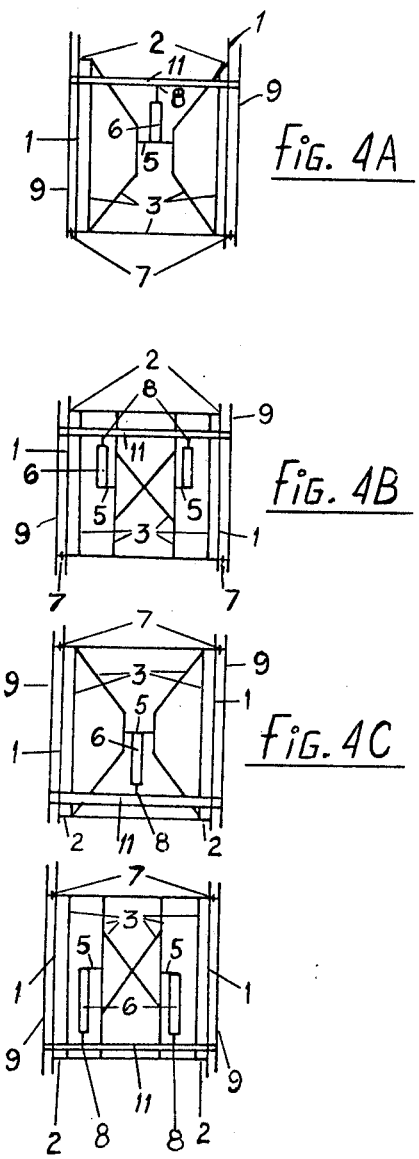
Fig. 4A
Fig. 4B
Fig. 4C
Fig. 4D

LIFTING MEMBERS FOR TRUCK BODIES AND SIMILAR UNITS

BACKGROUND OF THE INVENTION

This invention is directed to hydraulic raising and lowering mechanisms for dump body or dump bed trucks, and the like, and is particularly directed to providing improvements in the structural arrangement of the lifting members of such a lifting mechanism, or raising and lowering mechanism, which is manifestly different from similar mechanisms heretofore known in the prior art, by mounting the extensible lift cylinder or lift cylinders on the pivoted lifting stabilizer arm which raises the dump frame so that the lift cylinder travels up and down in an arcuate path with the lifting stabilizer arm, whereby a minimum of travel distance of the extensible cylinder which is also connected to the dump frame is obtained, thus providing faster unloading of the truck dump body.

SUMMARY OF THE INVENTION

The mechanism of the present invention can be mounted in various ways and in different positions according to the requirements and characteristics of the truck on which it is to be installed.

A tipping mechanism or dump frame is pivotally connected adjacent one end to a pair of spaced truck frame members or a pair of frame members adapted to be placed on the flat bed of a truck for converting it to a dump body or dump frame truck. A generally rectangular lifting stabilizer arm assembly is pivotally connected on opposite sides at one end thereof between the opposite truck frame members by means of two fixed pivot connections, so that the lifting stabilizer arm assembly is free to rotate in an upward arc relative to the truck frame from a horizontal stored position generally between the truck frame members. The opposite end of the generally rectangular lifting stabilizer arm is provided with two sliding point connections with the opposite longitudinal members of the dump frame and these connections being in the form of rollers on the stabilizer arm engaging in slide tracks on opposite sides of the dump frame.

A hydraulic cylinder-piston assembly or a pair of hydraulic cylinder-piston assemblies are pivotally connected at one end to the approximate center portion of the lifting stabilizer arm assembly and pivotally connected at the opposite end to a transverse cross-brace on the dump frame. Upon actuation of the hydraulic cylinder-piston assembly by pressurized hydraulic fluid or the like, actuating lifting force is applied directly between the dump frame and the lifting stabilizer arm, when they are both in the lowered substantially horizontal rest position causing the dump frame and the lifting stabilizer arm assembly to simultaneously pivot upwardly in separate circular arcs, raising the dump frame and any dump body carried thereby to a position disposed approximately 60° to the horizontal or any desired slop as may suit the requirement and characteristics required for dumping a particular vehicle.

The cylinder-piston assembly or assemblies are connected to the lifting stabilizer arm at a point approximately half way of its length, such that the cylinder-piston has very small dimensions and the piston rod has a small travel distance, in spite of which, due to its positioning, it provides the necessary dumping motion of the vehicle which has heretofore been achieved only by much larger cylinder-piston assemblies having distance travels at least twice that as required in the present arrangement.

The generally rectangular stabilizer arm avoids possible side-dumping of the raised dump frame to the side and avoids deforming the dump frame and truck frame members as well as the other mechanisms and provides a smooth non-binding operation by means of the four-point connection of the assembly, namely, two fixed pivot connections at one end to the truck frame members and two sliding draw-point connections at the opposite end to the track members of the dump frame. By the novel arrangement of the cylinder-piston assembly at a suitable point on the lifting stabilizer arm, numerous advantages are obtained, among which are the following:

a. a minimum travel of the cylinder, that is a minimum reciprocating distance of the cylinder rod relative to the cylinder;

b. therefore, a cylinder of much smaller length and diameter can be used than is normally used in similar lifting mechanism;

c. less oil or hydraulic fluid is used than with conventional lifting mechanisms, therefore resulting in less weight, for the same reason;

d. greater lifting, dumping and return speed than obtainable with conventional type lifting mechanism; and e. sizeable saving in equivalent cost of approximately 40% of the cost of conventional types of lifting mechanisms.

These and other advantages of the invention will become apparent to one skilled in the art from the specification hereinafter following by reference to the accompanying drawings which disclose several forms of the mechanism within the scope of the invention.

BRIEF DESCRIPTION OF THE DRAWINGS

FIG. 3 is an end elevational view of the mechanism in a raised position from the left end of FIG. 1, and showing in phantom lines a modified form utilizing a pair of lift cylinders;

FIG. 4A is a schematic diagram of the lift mechanism shown in FIGS. 1-3;

FIG. 4B is a schematic diagram of the modified form of the mechanisms shown in phantom lines in FIG. 3; and FIGS. 4C and 4D are schematic diagrams of modified forms of the mechanisms shown respectively in FIGS. 4A and 4B.

DESCRIPTION OF THE PREFERRED EMBODIMENTS

Figures 1, 2:
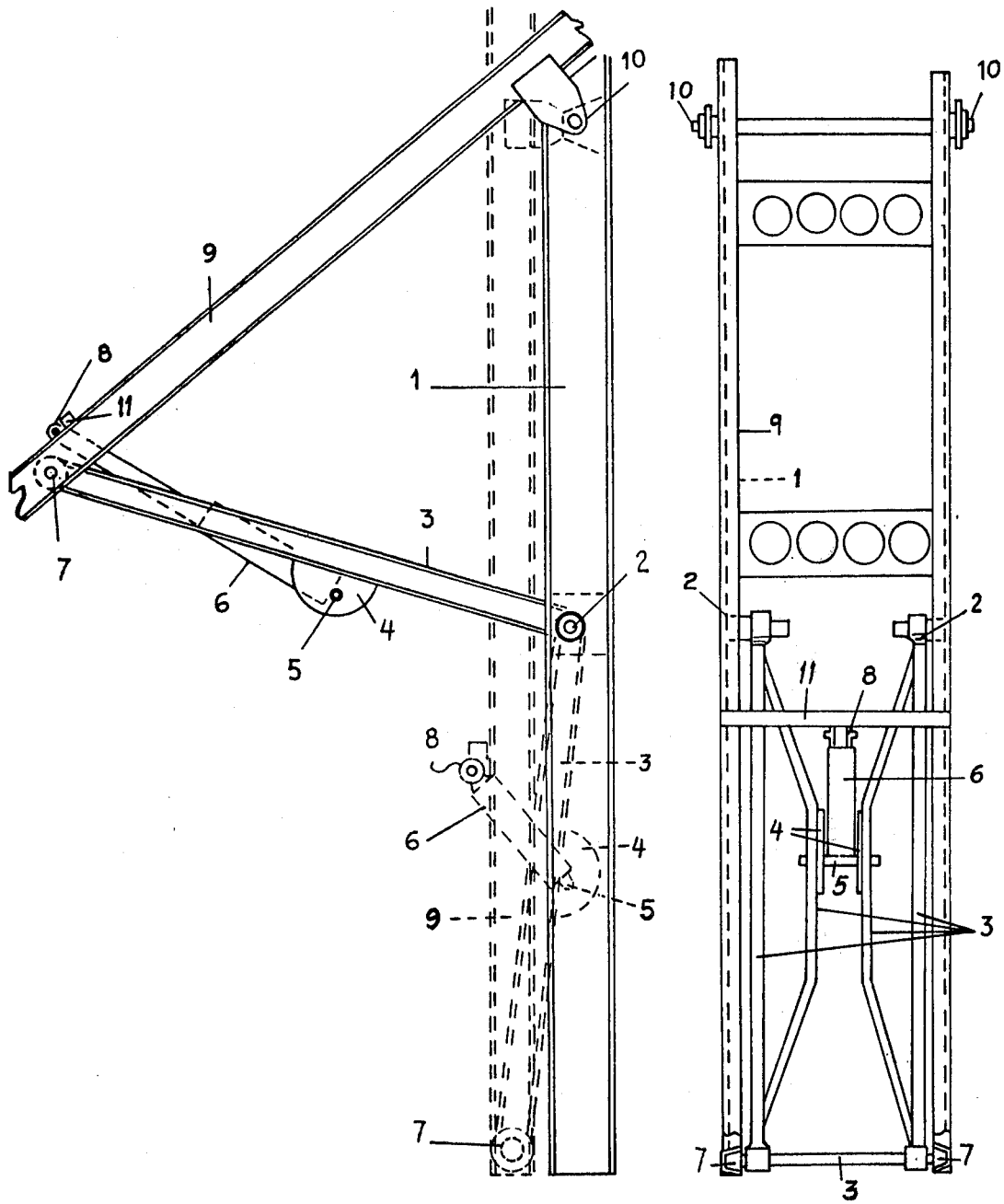
FIG. 1 is a side elevational view of the dump frame lifting mechanism of the invention.
FIG. 2 is a top plan view of the mechanism of FIG. 1 in a lowered position.

Referring to the drawings in greater detail, reference numeral 1 designates a pair of laterally spaced longitudinally extending frame members, with appropriate cross-bracing, which may be the frame members of an existing truck body or members of a false frame adapted to be placed on top of a flat bed for converting a flat bed truck or the like into a dump body truck. A dump frame 9 or tipping frame, adapted to carry a dump body, dump bed, or the like, is pivotally connected at 10 to the truck frame members 1, adjacent the rear end of the truck frame members and is adapted to pivot from a horizontal position shown in dotted lines in FIG. 1 overlying the vehicle frame members to a raised dump position, as shown in full lines therein, through an arc of approximately 60°. A lifting stabilizer arm assembly, generally rectangular in shape and indicated generally at 3 in the drawings, includes a pair of longitudinally extending side members, and inwardly extending bracing members which function as appropriate cross-bracing between the side members, is pivotally connected at one end by fixed pivot connections 2 between the truck frame members 1. A pair of outwardly directed rollers 7 are connected on the opposite sides of the outer free end of the lifting stabilizer arm assembly and these rollers extend into rolling and sliding engagement with slide tracks or channels in the side of the oppositely disposed dump frame members 9. The rollers 7 form a draw-point for the lifting mechanism and as shown in the mechanism of FIGS. 1-4A, in the stored or non-use position of the mechanism, the draw-point is positioned on the opposite side of pivot connections 2 from dump frame pivot connections 10. The generally rectangular stabilizer arm assembly 3 performs a stabilizing function between the dump frame 9 and vehicle frame members 1 by having a pair of fixed pivot connections at one end to the frames 1 and a stabilizing pair of rolling or sliding connections at the opposite end with the dump frame 9 such that the four-point connection of the stabilizer arm assembly 3 in combination with the pair of pivot connections 10 between the frames 9 and 1 eliminate torsion forces in the dump frame 9 and in the truck frame members 1, and avoid side dumping of the dump frame when it is raised to the dump position with a load thereon. At the same time, stabilizer arm assembly 3 performs the function of a lifting arm assembly for the dump frame 9 since it is freely pivotal about pivot connections 2, between a lowered position as indicated in dotted lines in FIG. 1, substantially between the truck or vehicle frame members 1, and a raised position as shown in full lines in FIG. 1.

A lift cylinder-piston assembly 6 is pivotally connected on one end as indicated at 5, preferably the base end of the cylinder, about a fixed pivot axis extending laterally between supports 4 on the cross-bracing members of lifting stabilizer arm assembly 3 at a point approximately half the length of this assembly. The cylinder-piston assembly 6 has very small length and diameter dimensions and the cylinder rod has a very short travel distance or stroke and the opposite end of this assembly, preferably the free end of the rod of the piston that reciprocates within the cylinder, is pivotally connected at 8 to a cross-member 11 extending between and rigid with the pair of laterally spaced dump frame members 9. Lifting forces are thus transmitted from the cylinder-piston assembly 6 through pivot connection 8 to member 11 of dump frame 9. In the non-use position of the mechanism, as shown in dotted lines in FIG. 1, the cross-member 11 is closely adjacent to the fixed pivot connection 2, and in the non-use position the cylinder-piston assembly 6 is in the retracted position, while it is in the extended position as shown in full lines in FIG. 1, as shown in full lines in FIG. 1, when the mechanism is in the raised dump position. As cylinder 6 is pressurized with hydraulic fluid, or the like, the cylinder rod begins extending out of the cylinder and pushing upwardly on dump frame 9 through cross-member 11 causing the dump frame to move upwardly in an arcuate path around pivot connection 10, and simultaneously due to movable draw-point connection of the dump frame to the lifting stabilizer arm 3 at 7, arm 3 simultaneously rotates upwardly along a separate arcuate path about its pivot connections 2 in a clockwise direction. The cylinder-piston assembly 6 is thus transported upwardly in an arcuate path with lifting stabilizer arm 3 during the lifting operation and this provides the advantages enumerated earlier in this specification, and this novel structural arrangement provides the necessary movement of the dump frame to the dump position relative to the vehicle frame with only a short travel distance of the piston rod relative to the cylinder.

The pivot support and pull-points of the cylinder-piston assembly 6 may change to suit the type and tonnage of the truck and dump body to be lifted, while still maintaining the same basic arrangement of the mechanism. Likewise, the fixed rotation point 2 of the lifting stabilizer arm assembly 3 may be positioned in the center part of vehicle frame members 1 as shown in FIG. 1, or may be positioned further to the left on the frame members, that is, further from the pivot point 10, or it can be positioned further to the right, i.e. closer to pivot point 10, as may be suitable to the type of truck on which the mechanism is to be installed and as may be suitable for the tonnage to be lifted by the dump frame. FIGS. 4C and 4D schematically show modified forms of the mechanism of the invention in which lifting stabilizer arm 3 is positioned under dump frame 9 such that its pivot connection 2 is closer to pivot connection 10 than is shown in FIG. 1 of the drawings. It is also possible, in referring to FIG. 1, that lifting stabilizer arm 3 may be arranged to rotate clockwise to the stored position beneath dump frame 9 rather than rotate counterclockwise to the stored position as indicated by the dotted line, shown in FIG. 1.

A modified form of the lift mechanism structure is shown in FIGS. 3 and 4B, wherein a pair of lift cylinder-piston assemblies 6 are pivotally connected at 5 along fixed axes to the central bracing members of stabilizer arm 3, in lieu of a single cylinder-piston assembly. The opposite ends the cylinder-piston assemblies 6 are pivotally connected in a similar manner at 8 to the cross-member 11 of dump frame 9, and the assemblies 6 are connected within the longitudinal side members of the generally rectangular lifting mechanism arm assembly 3.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A lifting mechanism for truck bodies and the like in combination with a pair of laterally spaced longitudinal stationary frame members, a dump frame pivotally connected to said stationary frame members adjacent one end thereof, said dump frame including a pair of laterally spaced longitudinal track members disposed in a plane immediately above and parallel to the plane of said longitudinal stationary frame members, a rectangular frame lifting stabilizer assembly positioned between and spanning substantially the entire lateral distance between said stationary frame members and said track members, a pair of pivot connections connecting the inner end of said rectangular frame lifting stabilizer assembly to said pair of laterally spaced stationary frame members, a pair of connectors on the opposite end of said rectangular frame lifting stabilizer assembly engaged for sliding movement in said pair of laterally spaced longitudinal track members, said rectangular frame lifting stabilizer assembly having side frame members, a pair of longitudinally extending brace portions positioned between and extending parallel with said side frame members only at the medial portion of said rectangular frame lifting stabilizer assembly, a pair of diagonally extending brace portions connected to the opposite ends of each of said longitudinally extending brace portions and diverging laterally into connection with the opposite ends of the adjacent side frame member, said pair of longitudinally extending brace portions being laterally spaced to form a longitudinal channel therebetween, an extensible lift cylinder-piston assembly positioned in the longitudinal channel between said pair of longitudinally extending brace portions, a cross-member extending at substantially right angles between and connecting said pair of longitudinally extending brace portions and pivotally connecting one end of said extensible lift cylinder-piston assembly to a medial portion of the length of said rectangular frame lifting stabilizer assembly, a support member connected laterally of said dump frame in a longitudinal position between said cross member and said pivot connections connecting the inner end of the rectangular frame lifting assembly to said stationary frame members when the dump frame is in a horizontal position, said lift cylinder-piston assembly having a longitudinal axis diagonally intersecting the planes of said rectangular frame lifting assembly and said dump frame when the latter is in a horizontal position, and the other end of said lift cylinder-piston assembly pivotally connected to said support member, said lift cylinder-piston assembly being contained within the length of said rectangular frame lifting stabilizer assembly when the dump frame is in a horizontal position, whereby upon extension of said extensible lift cylinder-piston assembly said dump frame is moved about its pivot connection with said stationary frame members from a horizontal position to a raised dump position and simultaneously said lifting stabilizer assembly is moved about its pivot connection with said stationary frame members and carries said lift cylinder-piston assembly therewith.

2. A lifting mechanism as set forth in claim 1 in which said pair of connectors on the opposite end of said lifting stabilizer assembly, in the non-use position of said dump frame, slidably engage the dump frame at a position on the opposite end thereof from the pivot connection of said dump frame to said stationary frame members.

3. A lifting mechanism as set forth in claim 1 in which said lift cylinder-piston assembly is connected along the longitudinal center axis of said lifting stabilizer assembly.

* * * * *